(12) United States Patent
Matsuno et al.

(10) Patent No.: US 8,895,153 B2
(45) Date of Patent: Nov. 25, 2014

(54) CHEMICAL CONVERSION COATED PLATED STEEL SHEET AND METHOD FOR PRODUCING SAME

(75) Inventors: Masanori Matsuno, Sakai (JP); Koichiro Ueda, Chiba (JP); Masaya Yamamoto, Sakai (JP); Hirofumi Taketsu, Sakai (JP)

(73) Assignee: Nisshin Steel Co., Ltd., Tokyo (JP)

( * ) Notice: Subject to any disclaimer, the term of this patent is extended or adjusted under 35 U.S.C. 154(b) by 120 days.

(21) Appl. No.: 13/704,868

(22) PCT Filed: Jun. 17, 2011

(86) PCT No.: PCT/JP2011/003483
§ 371 (c)(1),
(2), (4) Date: Feb. 28, 2013

(87) PCT Pub. No.: WO2011/158516
PCT Pub. Date: Dec. 22, 2011

(65) Prior Publication Data
US 2013/0157076 A1    Jun. 20, 2013

(30) Foreign Application Priority Data

Jun. 18, 2010 (JP) ................................. 2010-139682
Feb. 28, 2011 (JP) ................................. 2011-042209

(51) Int. Cl.
*B32B 15/04* (2006.01)
(Continued)

(52) U.S. Cl.
CPC . *C23C 22/00* (2013.01); *C09D 5/08* (2013.01); *C09D 127/12* (2013.01);
(Continued)

(58) Field of Classification Search
CPC ...... B32B 15/04; B32B 15/043; B32B 15/08; B32B 15/20; C23C 22/00; C23C 22/05; C23C 22/34; C23C 22/361; C23C 22/364; C23C 22/44; C23C 22/82; C23C 2222/00; C23C 2222/20
USPC ......... 428/623, 626, 632, 633, 650, 653, 639, 428/336
See application file for complete search history.

(56) References Cited

FOREIGN PATENT DOCUMENTS

| | | |
|---|---|---|
| JP | 57-38845 A | 3/1982 |
| JP | 3-271377 A | 12/1991 |

(Continued)

OTHER PUBLICATIONS

Machine Translation, Okai Kazuhisa, JP 2003-105555, Apr. 2003.*

*Primary Examiner* — Michael E La Villa
(74) *Attorney, Agent, or Firm* — Nath, Goldberg & Meyer; Joshua B. Goldberg; Tanya E. Harkins

(57) ABSTRACT

Disclosed is a chemical conversion coated Al-plated steel sheet which has excellent weather resistance, water resistance and coating film adhesion. Specifically, a chemical conversion coating liquid is applied over and dried on the surface of an Al alloy-plated steel sheet, thereby forming a chemical conversion coating film that has a film thickness of 0.5-10 μm. The chemical conversion coating liquid contains: a fluorine-containing olefin resin, which contains 7-20% by mass of F atoms and 0.05-5% by mass of hydrophilic functional groups that are selected from among a carboxyl group, a sulfonic acid group and salts of carboxyl group and sulfonic acid group and has a number average molecular weight within the range of 1,000-2,000,000; and an oxygen acid salt, fluoride, hydroxide, organic acid salt, carbonate or peroxygenated salt of a group 4A metal.

12 Claims, 2 Drawing Sheets

(51) Int. Cl.

| | | |
|---|---|---|
| B32B 15/08 | (2006.01) | |
| B32B 15/18 | (2006.01) | |
| B32B 15/20 | (2006.01) | |
| B05D 3/00 | (2006.01) | |
| B05D 3/02 | (2006.01) | |
| C23C 22/00 | (2006.01) | |
| C09D 5/08 | (2006.01) | |
| C09D 127/12 | (2006.01) | |
| C09D 127/22 | (2006.01) | |
| C23C 22/36 | (2006.01) | |
| C23C 28/00 | (2006.01) | |
| C23C 22/34 | (2006.01) | |
| C23C 22/44 | (2006.01) | |
| C23C 22/83 | (2006.01) | |

(52) U.S. Cl.
CPC ........... *C09D 127/22* (2013.01); *C23C 22/361* (2013.01); *C23C 28/00* (2013.01); *B05D 3/007* (2013.01); *C23C 22/34* (2013.01); *C23C 22/364* (2013.01); *C23C 22/44* (2013.01); *C23C 22/83* (2013.01); *C23C 2222/20* (2013.01)
USPC ........... 428/626; 428/653; 428/639; 428/336; 427/372.2; 427/388.1; 427/388.4

(56) References Cited

FOREIGN PATENT DOCUMENTS

| | | |
|---|---|---|
| JP | 5-202260 A | 8/1993 |
| JP | 2001-011645 A | 1/2001 |
| JP | 2001-335955 A | 12/2001 |
| JP | 2003-105555 A | 4/2003 |
| JP | 2003-293169 A | 10/2003 |
| JP | 2005-015834 A | 1/2005 |
| JP | 2005-206764 A | 8/2005 |
| JP | 2007-321223 A | 12/2007 |
| WO | 2005/071052 A1 | 8/2005 |

* cited by examiner

CHEMICAL CONVERSION COATED PLATED STEEL SHEET AND METHOD FOR PRODUCING SAME

TECHNICAL FIELD

The present disclosure relates to a chemically treated aluminum-based plated steel sheet which demonstrates excellent weather resistance, water resistance and film adhesion, and a method of preparing the same.

BACKGROUND ART

For some plated steel sheets, a chemical conversion film is formed that contains an organic resin in order to prevent galling at the time of formation (e.g., see Patent Literatures 1 and 2; hereinafter referred to as "PTL 1" and "PTL 2"). PTL 1 and 2 disclose that a chemical conversion film which contains an organic resin such as a urethane resin is formed on a surface of a zinc-based plated steel sheet. Coating the surface of the plated steel sheet in such a manner with a chemical conversion film that contains an organic resin not only allows for galling resistance to be improved, but also allows for corrosion resistance, tarnish resistance and/or the like to be improved.

On the other hand, a fluororesins, which exhibit excellent weather resistance, are sometimes used as the organic resin constituting the chemical conversion film in order to improve the weather resistance of the chemically treated plated steel sheet. When using fluororesins for improving weather resistance in such a manner, organic solvent-based fluororesin compositions are frequently used. However, such organic solvent-based fluororesin compositions have the drawbacks of being fire hazards, toxicity hazards, an air pollutants, and/or the like.

Moreover, various water-based fluororesin compositions are also provided (e.g., see Patent Literature 3; hereinafter referred to as "PTL 3"). However, such water-based fluororesin compositions all require baking at high temperatures (e.g., 180-230° C.; see PTL 3). Such a high-temperature baking is not feasible at painting sites (where air-dry resins are typically used), and is disadvantageous even in production line where heat-drying is mainly employed upon formation of coatings.

In addition, in order to solve the problem pertinent in water-based fluororesins, a curable moiety (organic functional group) is introduced, and a water-based fluororesin compositions are thereby provided from which a film can be formed even at low temperatures (e.g., see Patent Literature 4; hereinafter referred to as "PTL 4"). However, in the case of a cured film in which organic functional group have been reacted, weather resistance is preferentially deteriorated from the cured portions, and therefore the film becomes porous and water resistance decreases. Moreover, even when a surface treatment has been implemented using an epoxy resin, urethane resin or the like in order to improve adhesion, the organic resin preferentially deteriorated weather resistance, and dramatically reduces film adhesion.

CITATION LIST

Patent Literature

PTL 1
Japanese Patent Application Laid-Open No. 2005-15834
PTL 2
Japanese Patent Application Laid-Open No. 2005-206764
PTL 3
Japanese Patent Application Laid-Open No. 57-38845
PTL 4
Japanese Patent Application Laid-Open No. 05-202260

SUMMARY OF INVENTION

Technical Problem

As previously described, forming a chemical conversion film containing an organic resin on a surface of a plated steel sheet allows for galling resistance, corrosion resistance and adhesion of a film (coating) formed on the chemical conversion film to be improved. However, weather resistance may not be sufficient when a conventional chemically treated plated steel sheet which includes a chemical conversion film containing an organic resin is used as an exterior building material. Specifically, because many organic resins such as urethane resins are degraded by exposure to ultraviolet light, when a conventional chemically treated plated steel sheet is used as an exterior building material, a loss in a chemical conversion film that coats a surface of the plated steel sheet may occur over time. Accordingly, when the chemical conversion film is lost, a change in color, rust and/or the like may occur, the aesthetic appearance may thus be damaged, and the chemically treated plated steel sheet is undesirable as an exterior building material.

As a means for improving the weather resistance of the chemically treated plated steel sheet, fluororesins which are superior in weather resistance, are considered to be used as the organic resin constituting the chemical conversion film. The present inventors performed preliminary experiments in which a chemical conversion film was formed on a surface of a plated steel sheet using a water-based fluororesin emulsion, which is easy to handle. As a result, ultraviolet light resistance was improved by using the water-based fluororesin emulsion, but a film forming property, water resistance and film adhesion were decreased. As a result of additional studies by the present inventors, a reduction in these properties is assumed to be from an emulsifier that is used to prepare the water-based fluororesin emulsion (e.g., ammonium perfluorooctanoate) remaining in the chemical conversion film (see the below-described Reference Experiments).

As previously described, a conventional chemically treated plated steel sheet that includes a chemical conversion film containing an organic resin may demonstrate insufficient weather resistance. Moreover, although the weather resistance (ultraviolet light resistance) of a chemically treated plated steel sheet can be improved by using a water-based fluororesin as an organic resin, because the film forming property, water resistance and film adhesion were reduced, weather resistance, water resistance and film adhesion could not all be achieved.

An object of the present invention is to provide a chemically treated aluminum-based plated steel sheet having a chemical conversion film containing an organic resin, which is superior in weather resistance, water resistance, blackening resistance and film adhesion.

Solution to Problem

The present inventors found that weather resistance, water resistance and film adhesion of a chemical conversion film were improved by using as an organic resin a high molecular weight fluororesins in which a hydrophilic functional group was introduced and by cross-linking chains of the fluororesin with a group 4A metal compound. Thus, the present inventors completed the present disclosure after further testing was performed.

Specifically, a first aspect of the present invention relates to a chemically treated aluminum-based plated steel sheet described hereinafter.

[1] A chemically treated aluminum-based plated steel sheet, comprising: an aluminum-based alloy plated steel sheet, the aluminum-based alloy containing 85-99% by weight of aluminum; and a chemical conversion film having a film thickness of 0.5-10 μm formed on a surface of the aluminum-based alloy plated steel sheet, wherein the chemical conversion film is a fluororesin containing 0.05-5% by weight of a hydrophilic functional group selected from the group consisting of a carboxyl group and a sulfonic acid group and 7-20% by weight of a fluorine atom, and 0.1-5% by weight in terms of a metal with respect to the fluororesin of a group 4A metal compound.

[2] The chemically treated aluminum-based plated steel sheet according to [1], wherein a ratio between the carboxyl group and the sulfonic acid group included in the fluororesin in terms of a carboxyl group/sulfonic acid group molar ratio is 5-60.

[3] The chemically treated aluminum-based plated steel sheet according to [1] or [2], wherein the chemical conversion film further contains a phosphate, and an amount of the phosphate with respect to the fluororesin is within a range of 0.05-3% by weight in terms of phosphorus.

[4] The chemically treated aluminum-based plated steel sheet according to any of [1] to [3], wherein the chemical conversion film further comprises a silane coupling agent, wherein an amount of the silane coupling agent with respect to the fluororesin is within a range of 0.5-5% by weight.

[5] The chemically treated aluminum-based plated steel sheet according to any of [1] to [4], wherein the group 4A metal is selected from the group consisting of Ti, Zr, Hf and any combination thereof.

[6] The chemically treated aluminum-based plated steel sheet according to any of [1] to [5], further comprising a preliminary chemical conversion film containing an oxide or hydroxide of a valve metal and a fluoride of a valve metal, the preliminary chemical conversion film formed between the aluminum-based alloy plated steel sheet and the chemical conversion film.

A second aspect of the present invention relates to a method of preparing a chemically treated aluminum-based plated steel sheet described hereinafter.

[7] A method of preparing a chemically treated aluminum-based plated steel sheet, the method comprising: preparing an aluminum-based alloy plated steel sheet, the aluminum-based alloy containing 85-99% by of weight aluminum; and forming a chemical conversion film that has a thickness of 0.5-10 μm, by coating and drying a chemical treatment solution on a surface of the aluminum-based alloy plated steel sheet, wherein: the chemical treatment solution contains a fluororesin containing 0.05-5% by weight of a hydrophilic functional group selected from the group consisting of a carboxyl group and a sulfonic acid group, 7-20% by weight of a fluorine atom, the fluororesin in which a number-average molecular weight is 1,000-2,000,000, and an oxoate, a fluoride, a hydroxide, an organic salt, a carbonate or a peroxygenated salt of a group 4A metal; and an amount of the oxoate, the fluoride, the hydroxide, the organic salt, the carbonate or the peroxygenated salt of the group 4A metal is within a range of 0.1-5% by weight in terms of metal with respect to the fluororesin.

[8] The method of preparing the chemically treated aluminum-based plated steel sheet according to [7], wherein a ratio between the carboxyl group and the sulfonic acid group contained in the fluororesin in terms of a carboxyl group/sulfonic acid group molar ratio is 5-60.

[9] The method of preparing the chemically treated aluminum-based plated steel sheet according to [7] or [8], wherein the chemical treatment solution further contains a phosphate, and an amount of the phosphate with respect to the fluororesin is within a range of 0.05-3% by weight in terms of phosphorus.

[10] The method of preparing the chemically treated aluminum-based plated steel sheet according to any of [7] to [9], wherein the chemical treatment solution further contains a silane coupling agent, and an amount of the silane coupling agent with respect to the fluororesin is within a range of 0.5-5% by weight.

[11] The method of preparing the chemically treated aluminum-based plated steel sheet according to any of [7] to [10], wherein the group 4A metal is selected from the group consisting of Ti, Zr, Hf and any combination thereof.

[12] The method of preparing the chemically treated aluminum-based plated steel sheet according to any of [7] to [11], further comprising forming a preliminary chemical conversion film by coating and drying a preliminary chemical treatment solution on a surface of the aluminum-based alloy plated steel sheet before forming the chemical conversion film, wherein the preliminary chemical treatment solution contains a valve metal salt and a fluoride ion.

Advantageous Effects of Invention

According to the present invention, a chemically treated aluminum-based plated steel sheet may be provided, in which weather resistance, water resistance and film adhesion are superior. Because the chemically treated aluminum-based plated steel sheet of the present invention is superior in weather resistance, water resistance, corrosion resistance and tarnish resistance, the chemically treated aluminum-based plated steel sheet is useful as a plated steel sheet for an exterior building material and/or the like.

DESCRIPTION OF EMBODIMENTS

Figure 1:
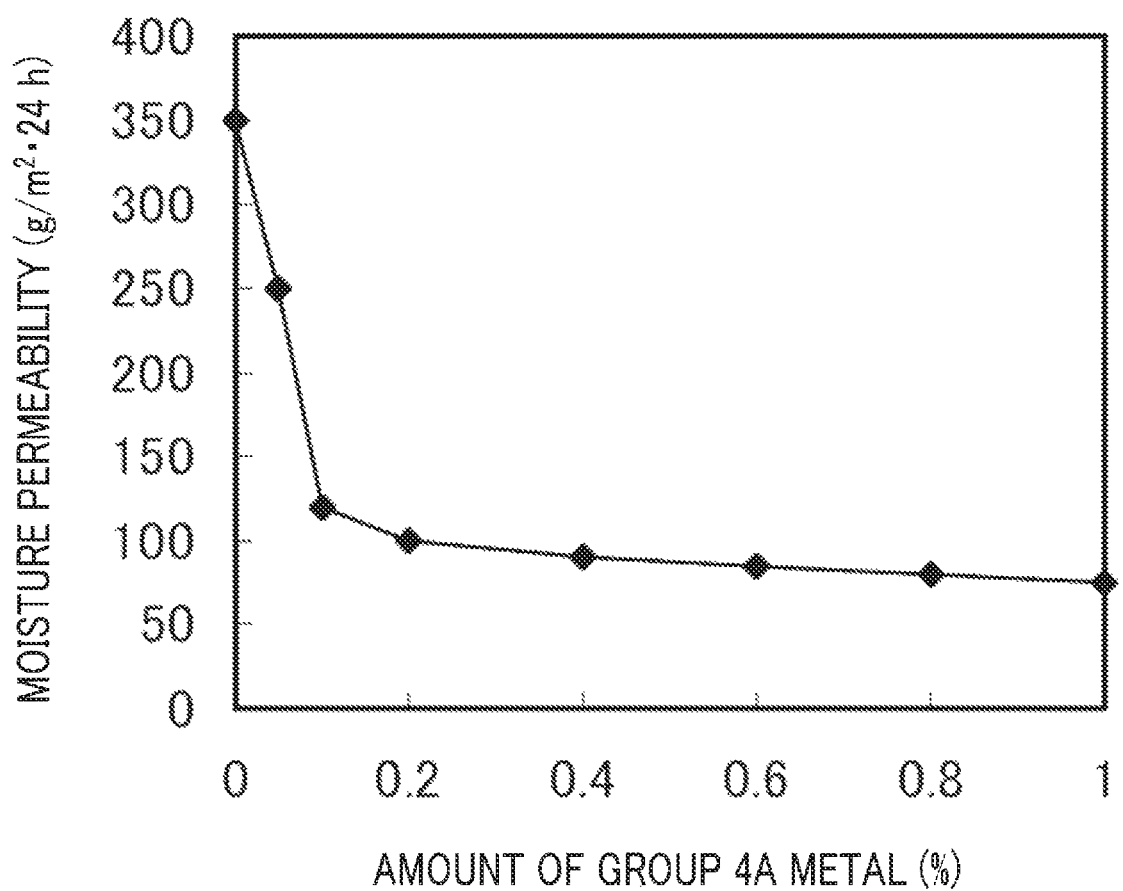
FIG. 1 is a graph showing a relationship between an amount of a group 4A metal in a fluororesin film and moisture permeability of the fluororesin film.

1. Chemically Treated Aluminum-Based Plated Steel Sheet

A chemically treated aluminum-based plated steel sheet of the present invention includes an aluminum-based alloy plated steel sheet (original sheet for chemical treatment) and a chemical conversion film formed on a surface of the aluminum-based alloy plated steel sheet. The chemically treated aluminum-based plated steel sheet of the present invention includes a chemical conversion film containing a high molecular weight fluororesin having a hydrophilic functional group (carboxyl group, a sulfonic acid group, and/or the like) introduced thereinto and a group 4A metal compound.

Hereinafter, each constituent element of the chemically treated aluminum-based plated steel sheet of the present invention will be described.

Original Sheet for Chemical Treatment

An aluminum-based plated steel sheet with excellent corrosion resistance and aesthetic quality is used as the original sheet for chemical treatment. The term "aluminum-based alloy plated steel sheet" as used herein refers to a steel plate including an aluminum-based alloy layer containing 85-99% by weight of aluminum and a residue that is substantially Si. An example of the aluminum-based coated alloy steel sheet includes hot-dip aluminum-9% Si plated steel sheet.

A low carbon steel, a medium carbon steel, a high carbon steel, an alloy steel and the like, may be used as a substrate steel of the aluminum-based alloy plated steel sheet. When formability is required, a steel sheet for deep drawing such as a low carbon steel alloyed with titanium or a low carbon steel alloyed with niobium are preferable as a substrate steel.

Preliminary Chemical Conversion Film

A preliminary chemical conversion film which contains an oxide or hydroxide of a valve metal and a fluoride of a valve metal may be formed on the surface of the aluminum-based alloy plated steel sheet that is used as the original sheet for chemical treatment. Accordingly, when the preliminary chemical conversion film is formed on the surface of the aluminum-based alloy plated steel sheet, the chemical conversion film is formed on the surface of the aluminum-based alloy plated steel sheet via the preliminary chemical conversion film.

The oxide or hydroxide of a valve metal demonstrates high-insulating resistance. Accordingly, the preliminary chemical conversion film that contains an oxide or hydroxide of a valve metal acts as a resistive material against the transfer of electrons. Consequently, the reduction of dissolved oxygen contained in the moisture in air is limited, and the oxidation, which is the counter-reaction of reduction, of the aluminum-based alloy plated steel sheets can also be limited. As a result, elution (corrosion) of a metal component from the aluminum-based alloy plated steel sheet that forms a substrate is limited. Among these, a tetravalent compound of a group 4A element such as Ti, Zr and Hf is a stable compound, and thus forms an excellent high-insulating film.

Moreover, film defects inevitably occur in the chemical conversion film during chemical treatment or formation. Because the substrate is exposed in a defective portion of the film, a corrosion inhibition effect cannot be expected even if a chemically treatment is performed. On the other hand, the above-described preliminary chemical conversion film contains a fluoride of a valve metal, and thus has a self-repair ability. Specifically, the fluoride of the valve metal is reprecipitated as a poorly-soluble oxide or hydroxide on a surface of the substrate steel that is exposed from a film defect portion after the fluoride of the valve metal is dissolved in the moisture contained in air. As a result, because the defective portion of the film is filled in, a self-repair ability is generated.

The chemically treated aluminum-based alloy plated steel sheet of the present invention is prepared by performing a chemical treatment on a non-treated aluminum-based alloy plated steel sheet. Non-treated aluminum-based alloy plated steel sheets are, however, insufficient in corrosion resistance. Accordingly, corrosion may occur during the storage, transportation or formation of the non-treated aluminum-based alloy plated steel sheet. Therefore, corrosion can be prevented from actually occurring on the non-treated aluminum-based alloy plated steel sheet by forming the preliminary chemical conversion film on the non-treated aluminum-based alloy plated steel sheet.

During the storage, transportation or formation (including welding) of the aluminum-based alloy plated steel sheet that includes the preliminary chemical conversion film, a portion of the preliminary chemical conversion film may peel off, break off, or fall off. Accordingly, the surface of the aluminum-based alloy plated steel sheet is exposed, and the chemical conversion film that contains the fluororesin and the group 4A metal compound is in direct contact with the exposed surface.

The preliminary chemical conversion film demonstrates an effect of improving the adhesion of the aluminum-based alloy plated steel sheet and the chemical conversion film. Accordingly, a chemical conversion film that is formed at a location where the preliminary chemical conversion film has been peeled off is generally thought to exhibit a reduction in film adhesion. However, aluminum is eluted from the plating layer that is in direct contact with the chemical conversion film. Thus, the corrosion resistance and the film adhesion of the chemical conversion film are improved by means of aluminum eluted in the chemical conversion film. Accordingly, the adhesion between the chemical conversion film and the aluminum-based alloy plated steel sheet increases, and therefore, the corrosion resistance of the chemical conversion film increases even at the location where the preliminary chemical conversion film has been peeled off. Hereinafter, a mechanism will be described by which the corrosion resistance and the film adhesion of the chemical conversion film are improved owing to the presence of aluminum in the chemical conversion film.

The preliminary chemical conversion film may be formed by drying the coating of preliminary chemical treatment solution formed on the surface of the aluminum-based alloy plated steel sheet as the substrate. A valve metal salt, a fluoride ion, and water, which is a solvent, are added in the preliminary chemical treatment solution. The valve metal salt forms a valve metal oxide, hydroxide or fluoride included in the preliminary chemical conversion film by drying the coating of the preliminary chemical treatment solution.

Examples of the valve metal may include Ti, Zr, Hf, V, Nb, Ta, Mo and W. The valve metal that is added to the preliminary chemical treatment solution may be a valve metal halide or oxoate, or the like. When the valve metal salt that is added is a fluoride, the valve metal may also act as a fluoride ion source.

Examples of titanium salts may include $K_n TiF_6$ (where K is an alkali metal or an alkali earth metal; n is 1 or 2), $K_2[TiO(COO)_2]$, $(NH_4)_2 TiF_6$, $TiCl_4$, $TiOSO_4$, $Ti(SO_4)_2$, and $Ti(OH)_4$. On the other hand, the fluoride ion source included in the preliminary chemical treatment solution may be a valve metal salt including a fluorine atom or may also be a soluble fluoride (e.g., $(NH_4)F$).

In order to stabilize a valve metal salt in the preliminary chemical treatment solution, an organic acid that has a chelating action is preferably added. The organic acid is able to stabilize the chemical treatment solution by chelation of metal ions. Accordingly, the additive amount of the organic acid is set so that the molar ratio of organic/metal ions is at least 0.02. Examples of the organic acid may include tartaric acid, tannic acid, citric acid, oxalic acid, malonic acid, lactic acid, acetic acid, and ascorbic acid. Among these, oxycarboxylic acids such as tartaric acid and polyvalent phenols such as tannic acid not only stabilize the preliminary chemical treatment solution but also act in complimenting the self-repair ability of fluoride, and are therefore effective in improving adhesion.

An orthophosphate or polyphosphate of any of various metals may be added to the preliminary chemical treatment solution. Accordingly, a soluble or poorly-soluble metal phosphate or a complex phosphate is included in the preliminary chemical conversion film.

A soluble metal phosphate or complex phosphate is eluted from the preliminary chemical conversion film in a defective portion thereof and reacts with the plating component (Al or the like) of the aluminum-based alloy plated steel sheet that is the substrate steel, to thereby precipitate a poorly-soluble phosphate. Accordingly, the self-repair ability of titanium fluoride is complimented. Moreover, because the moisture in the atmosphere is slightly acidified when the poorly-soluble phosphate is dissociated, the hydrolysis of titanium fluoride and the generation of poorly-soluble titanium oxide or hydroxide are promoted.

The metal of the soluble metal phosphate or complex phosphate may be an alkali metal or an alkali earth metal; manganese; and/or the like. The soluble metal phosphate or complex phosphate may also be added to the preliminary chemical treatment solution in the form of any of various metal phosphates or as a blend mixture of any of various metal salts and phosphoric acid, polyphosphoric acid or phosphate.

On the other hand, a poorly-soluble metal phosphate or complex phosphate improves film strength by diffusing in the preliminary chemical conversion film to eliminate film defects. The metal of the poorly-soluble phosphate or complex phosphate may be Al, Ti, Zr, Hf, Zn and/or the like. The poorly-soluble phosphate or complex phosphate may be added to the preliminary chemical treatment solution in the form of any of various metal phosphates or as a blend mixture of any of various metal salts and phosphate, polyphosphoric acid, or phosphate.

An organic wax such as a fluorine-based wax, a polyethylene-based wax, and a styrene-based wax; an inorganic lubricant such as silica, molybdenum sulfide, and talc; and/or the like, may be added to the preliminary chemical treatment solution. The lubrication of the preliminary chemical conversion film may be improved by adding the above-described organic wax, inorganic lubricant, and/or the like. It is thought that a low melting point organic wax bleeds on the film surface and lubrication is achieved when the coating of the preliminary chemical treatment solution is dried. On the other hand, a high melting point organic wax or inorganic lubricant is dispersed in the film. However, it is thought that lubrication is achieved by exposing the outermost surface of the film surface in an island-like distribution.

When performing elemental analysis such as X-ray fluorescence, ESCA or the like, of a preliminary chemical conversion film obtained by drying a coating of the preliminary chemical treatment solution, the concentrations of oxygen and fluorine present in the preliminary chemical conversion film are measured. The concentration ratio (atomic ratio) of the two elements, F/O ratio, is preferably at least 1/100. Accordingly, corrosion of the obtained chemically treated steel sheet is prevented. Specifically, when the element concentration ratio F/O (atomic ratio) is at least 1/100, the occurrence of corrosion originating at the defective portion of the film is significantly decreased. It is assumed that this was because a sufficient amount of titanium fluoride was included in the preliminary chemical conversion film, and thus self-repair ability achieved.

Chemical Conversion Film

The chemical conversion film is formed on a surface of the above-described aluminum-based-alloy plated steel (original sheet for chemical treatment). A preliminary chemical treatment such as formation of an underlying coating may or may not be performed on the surface of the original sheet for chemical treatment. Moreover, a chemical conversion film is directly formed on the surface of the original sheet for chemical treatment when no preliminary treatment is performed on the surface of the original sheet for chemical treatment. The chemical conversion film improves the weather resistance, the blackening resistance and/or the like of the aluminum-based alloy plated steel sheet.

An object of the present invention is to improve the weather resistance, water resistance and film adhesion of the chemical conversion film. As previously described, in order to improve the weather resistance (ultraviolet light resistance) of the chemical conversion film, a fluororesin may be used as an organic resin. Fluororesins are broadly classified into solvent-based fluororesins and water-based fluororesins. Although recovery of an evaporated solvent is a problem when forming a chemical conversion film using a solvent-based fluororesin, this problem does not occur when a water-based fluororesin is employed. The present inventors attempted to form a chemical conversion film that was superior in weather resistance, water resistance and film adhesion, by using a water-based fluororesin that is easy to handle.

As previously mentioned, according to preliminary experiments conducted by the present inventors, a reduction in water resistance of the chemical conversion film when it was formed using a water-based fluororesin emulsion was thought to be because the emulsifier used when preparing the water-based fluororesin emulsion remained in the chemical conversion film (see the below-mentioned reference experiments). The present inventors thought that, if a water-based fluororesin emulsion could be prepared using almost no emulsifier, a reduction in the water resistance of the chemical conversion film could be prevented. Accordingly, as a result of an investigation into various water-based fluororesins, the present inventors have found that a fluororesin having a predetermined amount of hydrophilic functional groups introduced thereinto may be used to prepare a water-based emulsion using almost no emulsifier, and may easily form a chemical conversion film that includes almost no emulsifier.

Moreover, the present inventors performed experiments not only on preventing a reduction in the water resistance of the chemical conversion film, but also on improving water resistance thereof. In addition, as a result of investigations performed from various perspectives, it was found that the water resistance of the chemical conversion film could be remarkably improved by increasing the molecular weight of the water-based fluororesin and crosslinking the water-based fluororesin with a group 4A metal compound.

In addition, the present inventors found that a chemical conversion film that is superior in weather resistance, water resistance and film adhesion can be formed by further formulating a group 4A metal compound into a chemical treatment solution containing as a primary component a high molecular weight fluororesin having a hydrophilic functional group introduced thereinto.

In the chemical conversion film of the chemically treated aluminum-based plated steel sheet of the present invention, weather resistance (ultraviolet light resistance) is improved by 1) mixing a fluororesin (preferably a fluorine-containing olefin resin). Moreover, weather resistance (ultraviolet light resistance) and water resistance are improved by 2) decreasing the usage of an emulsifier during emulsion preparation as much as possible by use of a fluororesin having hydrophilic functional groups introduced thereinto; 3) increasing the molecular weight of the fluororesin; and 4) crosslinking the fluororesin with a group 4A metal compound.

Hereinafter, each component included in the chemical conversion film will be explained.

1) Water-Based Fluororesin

The chemical conversion film contains a fluororesin as a primary component, and more specifically a fluorine-containing olefin resin. The amount of fluororesin contained in the chemical conversion film as the primary component is preferably in a range of 70-99% by weight. As previously described, weather resistance (ultraviolet light resistance) of the chemical conversion film may be improved by using a fluororesin as the organic resin that constitutes the chemical conversion film.

A water-based fluororesin that is easy to handle, is more preferable than an organic solvent-based fluororesin. The term "water-based fluororesin" refers to fluororesin having a hydrophilic functional group. Examples of desirable hydrophilic functional groups may include carboxyl group, sulfonic group, and salts thereof. Examples of salts of carboxyl group or sulfonic group may include ammonium salts, amine salts, and alkali metal salts.

A desired water-based fluororesin (preferably a fluorine-containing olefin resin) contains 0.05-5% by weight of a hydrophilic functional group. The fluororesin-containing 0.05-5% by weight of a hydrophilic functional group can be converted into a water-based emulsion even using almost no emulsifier. A chemical conversion film that contains almost no emulsifier can serve as a chemical conversion film that is superior in water resistance.

The amount of a hydrophilic functional group in the water-based fluororesin may be determined by dividing the total molar mass of the hydrophilic functional groups included in the water-based fluororesin by the number-average molecular weight of the water-based fluororesin. Because the molar mass of carboxyl group is 45 and the molar mass of sulfonic acid group is 81, the total molar mass of the hydrophilic functional groups included in the water-based fluororesin is found by calculating the numbers of carboxyl groups and sulfonic acid groups, multiplying their molar mass by the respective numbers of carboxyl groups and sulfonic acid groups, and summing the products. The number-average molecular weight of the water-based fluororesin is measured by GPC.

While the carboxyl group in the water-based fluororesin contributes to an improvement in the adhesion between the chemical conversion film and plating layer surface by forming a hydrogen bond with the plating layer surface, the crosslinking reaction with the group 4A metal compound is inhibited because H$^+$ does not readily dissociate. On the other hand, although the sulfonic acid group in the water-based fluororesin readily dissociates H$^+$, when the sulfonic acid group remains unreacted in the film without undergoing a cross-linking reaction with the group 4A metal compound, the water resistance of the film may be remarkably reduced because of a strong adsorption effect of water molecules. Accordingly, both the carboxyl group and the sulfonic acid group are preferably included in the water-based fluororesin, in order to make use of their respective properties. In such a case, the ratio of carboxyl groups to sulfonic acid groups in terms of carboxyl group/sulfonic acid group molar ratio is preferably within a range of 5-60.

The number-average molecular weight of the water-based fluororesin included in the chemical conversion film (preferably a fluorine-containing olefin resin) is preferably at least 1,000, more preferably at least 10,000, and even more preferably at least 200,000.

When the molecular weight of the water-based fluororesin included in the chemical conversion film is too low, the water permeability and water resistance of the chemical conversion film cannot be sufficiently improved. In such a case, because moisture, corrosive gas, and/or the like, easily passes through the chemical conversion film to reach the plated steel sheet, the plated steel sheet may be easily corroded. Moreover, because a radical generated by an effect of optical energy and/or the like easily acts on a terminal of a polymer chain when using a water-based fluororesin with a low molecular weight, a water-based fluororesin may be easily hydrolyzed by the synergistic effects of water and/or the like. In order to prevent these problems, the molecular weight of the water-based fluororesin included in the chemical conversion film may be increased to some extent and a cross-linking structure may be formed between chains of the water-based fluororesin. The water resistance is improved by increasing the molecular weight of the water-based fluororesin because van der Waals' force is strengthened and therefore the density of the chemical conversion film is increased. Moreover, hydrolyzation is inhibited because the bonding between atoms in the backbone of the water-based fluororesin is stabilized.

On the other hand, the number-average molecular weight of the water-based fluororesin included in the chemical conversion film is preferably no more than 2,000,000. When the number-average molecular weight exceeds 2,000,000, problems may occur in chemical treatment solution stability such as gelation.

The fluorine atom content in the water-based fluororesin included in the chemical conversion film is preferably within a range of 7-20% by weight. When the fluorine atom content is less than 7% by weight, the water resistance of the chemical conversion film cannot be sufficiently improved. On the other hand, when the fluorine atom content exceeds 20% by weight, coating is difficult to perform, and adhesion and drying property may be reduced. The fluorine atom content of the water-based fluororesin may be measured using an X-ray fluorescence analyzer.

A copolymer of a fluoroolefin and a hydrophilic functional group-containing monomer is exemplified as the water-based fluororesin. The hydrophilic functional group-containing monomer is a carboxyl group-containing monomer or a sulfonic acid group-containing monomer.

Examples of the fluoroolefin may include tetrafluoroethylene; trifluoroethylene; chlorotrifluoroethylene; hexafluoropropylene; vinyl fluoride; vinylidene fluoride; pentafluoropropylene; 2,2,3,3-tetrafluoropropylene; 3,3,3-trifluoropropylene; bromotrifluoroethylene; 1-chloro-1,2-difluoroethylene; and 1,1-dichloro-2,2-difluoroethylene. These fluoroolefins may be used alone or in combination. From the perspective of weather resistance (ultraviolet light resistance), a perfluoroolefin such as tetrafluoroethylene and hexafluoropropylene, or a vinylidene fluoride is preferable among these fluoroolefins. A fluoroolefin including a chlorine such as chlorotrifluoroethylene is not preferable because corrosion from chlorine ions may occur.

Unsaturated carboxylic acids such as those represented by formula (1) below and ester or acid anhydride thereof may be exemplified as examples of a carboxyl group-containing monomer.

[Formula 1]

(1)

wherein, $R^1$, $R^2$ and $R^3$ are the same or different, and $R^1$, $R^2$ and $R^3$ denote a hydrogen atom, an alkyl group, a carboxyl group, or an ester group; and n is within a range of 0-20.

Examples of the unsaturated carboxylic acid having formula (1) may include acrylic acid, methacrylic acid, vinyl acetate, crotonic acid, cinnamic acid, itaconic acid, itaconic acid monoester, maleic acid, maleic acid monoester, fumaric acid, fumaric acid monoester, 5-hexenoic acid, 5-heptenoic acid, 6-heptenoic acid, 7-octenoic acid, 8-nonenoic acid, 9-decenoic acid, 10-undecenoic acid, 11-decenoic acid, 17-octadecenoic acid, and oleic acid.

A carboxyl group containing vinyl ether monomer having formula (2) below may be exemplified as an example of another carboxyl group-containing monomer.

[Formula 2]

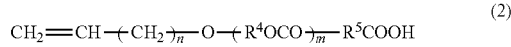

(2)

wherein, $R^4$ and $R^5$ are the same or different, and $R^4$ and $R^5$ denote a saturated or an unsaturated straight-chain or cyclic alkyl group; n is 0 or 1; and m is 0 or 1.

Examples of the carboxyl group containing vinyl ether monomer having formula (2) above may include 3-(2-aryloxyethoxycarbonyl)propionic acid; 3-(2-aryloxybutoxycarbonyl)propionic acid; 3-(2-vinyloxyethoxycarbonyl)propionic acid; and 3-(2-vinyloxybutoxycarbonyl)propionic acid.

Examples of a sulfonic acid-containing monomer may include vinylsulfonic acid; allylsulfonic acid; methallyl sulfonic acid; styrenesulfonic acid; 2-acrylamide-2-methylpropanesulfonic acid; 2-methylacryloyloxyethanesulfonic acid; 3-methacryloyloxypropanesulfonic acid; 4-methacryloyloxybutanesulfonic acid; 3-methacryloyloxy-2-hydroxypropanesulfonic acid; 3-acryloyloxypropanesulfonic acid; allyloxybenzenesulfonic acid; methallyloxybenzenesulfonic acid; isoprenesulfonic acid; and 3-aryloxy-2-hydroxypropanesulfonic acid.

Additional copolymerizable monomer(s) may be further copolymerized with a copolymer of fluoroolefin and hydrophilic functional group-containing monomer, where necessary. A carboxylic acid vinylester, an alkylvinylesters and a non-fluorine-based olefin may be exemplified as the additional copolymerizable monomer.

The carboxylic acid vinyl ester allows compatibility and glossiness to be improved, and the glass transition temperature to be increased. Examples of a carboxylic acid vinyl ester may include vinyl acetic acid, vinyl propionic acid, vinyl acetate, vinyl isoacetate, vinyl pivalate, vinyl caproate, vinyl versatate, vinyl laurate, vinyl stearate, vinyl cyclohexanecarboxylic acid, vinyl benzoate, and vinyl para-t-butylbenzoate.

Alkylvinylesters allow glossiness and plasticity to be improved. Examples of an alkylvinylester may include methylvinylether, ethylvinylether, and butylvinylether.

Non-fluorine-based olefins allow flexibility to be improved. Examples of a non-fluorine-based olefin may include ethylene, propylene, n-butene, and isobutene.

A fluoroolefin copolymer that has a hydrophilic functional group may be obtained by copolymerizing the above-described monomer with a known polymerization method. Accordingly, a water-based emulsion of a fluoroolefin copolymer may be prepared using almost no emulsifier by adjusting the amount of fluoroolefin in the original monomer composition so that the fluoroolefin copolymer includes 0.05-5% by weight of a hydrophilic functional group. Almost no emulsifier is included in a chemical conversion film formed using an emulsion of the fluoroolefin copolymer containing almost no emulsifier (no more than 1% by weight).

Accordingly, chemical conversion film that contains almost no emulsifier can be easily formed using, as a water-based fluororesin constituting the chemical conversion film, a fluororesin that has a hydrophilic group. A chemical conversion film formed in this manner achieves superior water resistance with almost no degradation observed in water resistance caused by a residual emulsifier.

2) Group 4A Metal Compound

The chemical conversion film includes a group 4A metal compound. The group 4A metal compound readily reacts with a functional group such as carboxyl group or sulfonic acid group in a water-based fluororesin, and promotes the curing or cross-linking reaction of the water-based fluororesin. Accordingly, the water resistance of the chemical conversion film may be improved even by low temperature drying.

Weather resistance readily deteriorates when a melamine resin, an isocyanate resin or the like is used in the cross-linking of the fluororesin. For example, a chemical conversion film cured by means of a melamine resin rapidly undergoes weather resistance deterioration due to oxidation and/or hydrolysis of ester bonds, formether bonds and/or the like. Moreover, the deterioration in weather resistance proceeds due to cleavage of the cross-linked structure by an acidic substance such as sulfate ions and nitrate ions contained in acid rain. Because a urethane bond formed in a cross-linked portion is weaker than a fluorine bond in the chemical conversion film cured using an isocyanate resin, the cross-linking structure is preferentially cut, and thus the deterioration in weather resistance proceeds.

Such a problem can be avoided and water resistance can also be improved by using a group 4A metal compound for the cross-linking of the fluororesin.

Moreover, the 4A metal compound improves the film adhesion and water resistance. Specifically, although a hard aluminum oxide present on the surface of the aluminum-based alloy plated steel sheet reduces the adhesion of the chemical conversion film, a reduction in film adhesion resulting from the aluminum oxide may be prevented by adding a group 4A metal compound in the chemical conversion film. Moreover, the group 4A metal compound also serves as an ion supply source of the group 4A metal ions that react with aluminum ions eluted by an etching reaction. A reaction product is concentrated on the interface between the plating layer and the chemical conversion film, to thereby allow initial corrosion resistance to be improved. Examples of a group 4A metal may include Ti, Zr, and Hf.

The amount of the group 4A metal compound of the chemical conversion film is preferably in a range of 0.1-5% by weight in terms of metal with respect to the fluororesin. When the amount is less than 0.1% by weight in terms of metal, the adverse effects that are attributed to the concentration of the aluminum oxide cannot be sufficiently prevented or the water-based fluororesin cannot be sufficiently cross-linked, and thus the water resistance of the chemical conversion film cannot be sufficiently improved. On the other hand, when the amount exceeds 5% by weight in terms of metal, the chemical conversion film may become porous, and workability and weather resistance may be reduced.

A metal equivalent amount of the group 4A metal compound in the chemical conversion film can be measured using an X-ray fluorescence analyzer.

As previously described, aluminum is present which eluted from the plating layer in the chemical conversion film. This aluminum contributes to an improvement in corrosion resistance. The improvement in corrosion resistance based on the presence of aluminum is assumed to be the result of the below-mentioned mechanism. Specifically, 1) because the chemical treatment solution is a weak alkaline, an aluminum oxide and metallic aluminum included in the plating layer are selectively eluted in the chemical treatment solution when the plating layer is coated with a chemical treatment solution. 2) Aluminum elutes in the chemical treatment solution in the form of $Al(OH)_4^-$ in a pH range of the chemical treatment solution. 3) The aluminum in the chemical treatment solution is incorporated in the chemical conversion film via a dehydration-condensation reaction and/or the like when forming the chemical conversion film by drying the chemical treatment solution. 4) As a result thereof, the insulation property, density, and/or the like, of the chemical conversion film are improved, to thereby improve corrosion resistance thereof.

3) Phosphate

The chemical conversion film preferably further contains a phosphate. The phosphate improves the adhesion to the aluminum-based alloy plated steel sheet of the chemical conversion film by reacting with the plating layer surface of the aluminum-based alloy plated steel sheet.

The type of phosphate is not specifically limited so long as the phosphate is a compound having a phosphate anion and the phosphate is water-soluble. Examples of the phosphate may include sodium phosphate, ammonium phosphate, magnesium phosphate, calcium phosphate, manganese phosphate, zinc phosphate, orthophosphoric acid, metaphosphoric acid, pyrophosphoric acid (diphosphoric acid), triphosphoric acid, and tetraphosphoric acid. These phosphates may be used alone or in combination.

The amount of the phosphate in the chemical conversion film is preferably within the range of 0.05-3% by weight as an amount in terms of phosphorus with respect to the fluororesin. When the amount in terms of phosphorus is less than 0.05% by weight, the reaction with the plating layer surface is incomplete, and thus the adhesion of the chemical conversion film cannot be sufficiently improved. On the other hand, when the amount in terms of phosphorus exceeds 3% by weight, the reaction with the group 4A metal compound excessively proceeds, and thus a cross-linking effect resulting from the group 4A metal compound is compromised.

The amount in terms of phosphorus of the phosphate in the chemical conversion film may be measured by using an X-ray fluorescence analyzer.

4) Silane Coupling Agent

The chemical conversion film preferably further contains a silane coupling agent. The adhesion of the chemical conversion film may be further improved by the mixing of a silane coupling agent. A silane compound including at least one functional group such as amino group, epoxy group, mercapto group, acryloxy group, methacryloxy group, alkoxy group, vinyl group, styryl group, isocyanate group, and chloropropyl group may be employed as the silane coupling agent.

The amount of the silane coupling agent in the chemical conversion film is preferably within the range of 0.5-5% by weight with respect to the fluororesin. When the amount of the silane coupling agent is less than 0.5% by weight, the adhesion of the chemical conversion film cannot be sufficiently improved. On the other hand, when the amount of the silane coupling agent exceeds 5% by weight, the film adhesion is saturated and no further improvement can be achieved.

The amount of silane coupling agent in the chemical conversion film may be measured by using an X-ray fluorescence analyzer.

The thickness of the chemical conversion film is preferably within the range of 0.5-10 µm. When the thickness is less than 0.5 µm, corrosion resistance, tarnish resistance, and/or the like, cannot be sufficiently achieved. On the other hand, even when the thickness is set to greater than 10 µm, an increase in performance along with an increase in thickness cannot be expected.

2. Method of Preparing a Chemically Treated Aluminum-Based Plated Steel Sheet

A method of preparing the chemically treated aluminum-based plated steel sheet of the present invention is not particularly limited in any manner. For example, the chemically treated aluminum-based plated steel sheet of the present invention may be prepared by the below-mentioned method.

The method of preparation for the chemically treated aluminum-based plated steel sheet of the present invention includes: 1) a first step of preparing an aluminum-based alloy plated steel sheet (original sheet for chemical treatment); 2) a second step of preparing a chemical treatment solution; and 3) a third step of forming the chemical conversion film on the surface of the aluminum-containing aluminum-based alloy plated steel sheet. Moreover, when forming the chemical conversion film on the surface of the aluminum-based alloy plated steel sheet with a preliminary chemical conversion film, the method of preparation for the chemically treated aluminum-based plated steel sheet further includes a step of forming the preliminary chemical conversion film by coating and drying the preliminary chemical treatment solution on the surface of the aluminum-based alloy plated steel sheet before the third step in which the chemical conversion film is formed.

Preparation of Original Sheet for Chemical Treatment

In the first step, the above-described aluminum-based alloy plated steel sheet is prepared as the original sheet for chemical treatment.

Preparation of Chemical Treatment Solution

In the second step, the chemical treatment solution including the fluororesin (preferably a fluorine-containing olefin resin) having the above-described hydrophilic functional group and the group 4A metal compound is prepared.

The chemical treatment solution can be prepared by the addition of a group 4A metal compound to the above-described water-based emulsion of a fluororesin having a hydrophilic functional group (preferably fluorine-containing olefin resin). A group 4A metal oxoate, fluoride, hydroxide, organic salt, carbonate, peroxygenated salt, and/or the like, may be used as the group 4A metal compound added to the chemical treatment solution. Examples of an oxoate may include hydrobromide, ammonium salt, alkaline metal salt, and alkaline earth metal salt. A phosphate, a silane coupling agent and/or the like may also be added to the chemical treatment solution where necessary.

The number-average molecular weight of the fluororesin included in the water-based emulsion is preferably at least 1000, more preferably at least 10,000, and even more preferably at least 200,000. As previously described, this is to impart water resistance in the chemical conversion film. On the other hand, from the perspective of treatment solution stability, the number-average molecular weight of the fluororesin is preferably no more than 2,000,000.

The fluororesin preferably contains 0.05-5% by weight of hydrophilic functional groups from the perspective of formulating a water-based emulsion containing almost no emulsifier.

The amount of the emulsifier in the fluororesin water-based emulsion is preferably no more than 1% by weight. When the emulsifier exceeds 1% by weight, the emulsifier may remain in the chemical conversion film, depending on the drying temperature, at the time that the chemical conversion film is formed in the third step. When the emulsifier remains in a chemical conversion film formed in this manner, it is not preferable because the water resistance of the chemical conversion film is remarkably reduced. As previously described, so long as the fluororesin contains a hydrophilic functional group, the water-based emulsion can be formulated even when the amount of the emulsifier is less than 1% by weight.

As an emulsifier that may be included in a fluororesin water-based emulsion, a fluorine-based emulsifier such as an ammonium salt of perfluorooctanoic acid and an ammonium salt of perfluorononanoic acid are preferable from the perspective of weather resistance and water resistance. In addition, any of the fluorine-based surfactants known in the art may also be used as an emulsifier.

The amount of the fluororesin in the chemical treatment solution is preferably within 10-70 parts by weight with respect 100 parts by weight of water. When the amount of the fluororesin is less than 10 parts by weight, there is a considerable amount of water evaporation in a drying step, and thus there may be a reduction in film formability and density of the chemical conversion film. On the other hand, when the amount of fluororesin included exceeds 70 parts by weight, the storage stability of the chemical treatment solution may be reduced.

The amount of oxoate, fluoride, hydroxide, organic salt, carbonate or peroxygenated salt of the group 4A metal in the chemical treatment solution is preferably with in the range of 0.1-5 parts by weight in terms of metal with respect to 100 parts by weight of the fluororesin. When the amount of these salts is less than 0.1 parts by weight, a cross-linking reaction and a reaction with the plating layer surface is inhibited, and thus water resistance and film adhesion of the chemical conversion film cannot be sufficiently improved. On the other hand, when the amount of these salts exceeds 5 parts by weight, the cross-linking reaction proceeds, and thus the storage stability of the chemical treatment solution may be reduced.

When a phosphate is added to the chemical treatment solution, the amount of the phosphate in the chemical treatment solution is preferably 0.05-3 parts by weight in terms phosphorus with respect to 100 parts by weight of the fluororesin. When the amount of the phosphate is less than 0.05 parts by weight, the adhesion of the chemical conversion film cannot be sufficiently improved. On the other hand, when the amount of the phosphate exceeds 3 parts by weight, the reaction with the group 4A metal compound excessively proceeds, and thus the cross-linking effect resulting from the group 4A metal compound may be compromised.

When the silane coupling agent is added to the chemical treatment solution, the amount of the silane coupling agent in the chemical treatment solution is preferably within a range of 0.5-5 parts by weight with respect to 100 parts by weight of the fluororesin. When the amount of the silane coupling agent is less than 0.5 parts by weight, the adhesion of the chemical conversion film cannot be improved. On the other hand, when the amount of the silane coupling agent exceeds 5 parts by weight, the film adhesion is saturated, and no further improvement can be achieved. Moreover, the stability of the treatment solution may be reduced.

An etching agent, an inorganic compound, a lubricant, a colored pigment, a dye and/or the like may be added where necessary to the chemical treatment solution as an additional component. A fluoride, and/or the like, may be used as the etching agent. The etching agent further increases the adhesion of the chemical conversion film via activation of the plating layer surface. Inorganic compound (e.g., oxides or phosphates) of Mg, Ca, Sr, V, W, Mn, B, Si, Sn and/or the like improve water resistance by densifying the chemical conversion film. An organic lubricant such as a fluorine-based lubricant, a polyethylene-based lubricant, or a styrene-based lubricant; or an inorganic lubricant such as molybdenum sulfide or talc may be introduced into the film from the chemical treatment solution, or lubrication of the chemical conversion film, to further improve the workability of the chemically treated aluminum-based alloy plated steel sheet. Moreover, a predetermined color tone may be achieved in the chemical conversion film by compounding an inorganic pigment, an organic pigment, an organic dye, and/or the like.

Formation of Chemical Conversion Film

In the third step, the chemical conversion film is formed on the surface of the aluminum-based alloy plated steel sheet prepared by the first step. In forming the chemical conversion film, the chemical treatment solution prepared by the second step may be coated and dried on the surface of the aluminum-based alloy plated steel sheet prepared by the first step.

A method of coating the chemical treatment solution is not particularly limited, and thus may be appropriately selected from a well-known method. Examples of such a coating method may include roll coating method, curtain flow method, spin coating method, spray coating method, and dip coating method.

Although drying of the chemical treatment solution may be performed at room temperature, drying time is preferably reduced by keeping the temperature at no less than 50° C. when considering a continuous operation. However, when the temperature is maintained at over 300° C., the performance of the chemical conversion film may be reduced by thermal decomposition of the organic components. Because of the small amount of emulsifier included in the chemical treatment solution used in the method of preparation of the present invention, a chemical conversion film that is superior in water resistance can be formed because almost no emulsifier is included even at a drying temperature of around 50° C.

According to the above-described method, the chemically treated aluminum-based plated steel sheet of the present invention can be prepared which is superior in weather resistance, water resistance and film adhesion.

Formation of Preliminary Chemical Conversion Film

In a step in which the preliminary chemical conversion film is formed, the coating film is formed by coating the preliminary chemical treatment solution on the surface of the aluminum-based alloy plated steel sheet prepared by the first step before forming the chemical conversion film. The preliminary chemical treatment solution may be coated by, e.g., the roll coating method, spin coating method, or spray coating method. The coating amount of the preliminary chemical treatment solution is preferably adjusted so that the deposition amount of a valve metal per unit area is at least 1 $mg/m^2$ in order that sufficient corrosion resistance is achieved in the obtained chemically treated steel sheet. Moreover, the coating amount of the preliminary chemical treatment solution is preferably formulated so that the thickness of the formed preliminary chemical conversion film is 3 nm to no more than 1,000 nm. Sufficient corrosion resistance is exerted when the preliminary chemical conversion film has a thickness of at least 3 nm. When the thickness exceeds 1,000 nm, cracks may occur due to stress.

The preliminary chemical conversion film may be formed by drying without rinsing the coating film that has been formed on the surface of the aluminum-based alloy plated steel sheet. Although drying may also be performed at room temperature, drying time is preferably reduced by keeping the temperature at no less than 50° C. when considering a continuous operation. However, when the drying temperature exceeds 200° C., the organic components included in the preliminary chemical conversion film undergo thermal decomposition, and the properties imparted by the organic components are subsequently compromised.

Hereinafter, the present invention will be explained with reference to Examples, which however shall not be construed as limiting the scope of the invention thereto.

EXAMPLES

Examples

1. Preparation of Chemically Treated Aluminum-Based Plated Steel Sheet (1)

A hot-dip aluminum-9% by weight of silicon alloy plated steel sheet (coating weight: 45 g/m$^2$) was fabricated using a cold-reduced carbon steel sheet (SPCC) with a thickness of 0.8 mm as a substrate steel. In the present example, the hot-dip aluminum-9% by weight of silicon alloy plated steel sheet was used as an original sheet for chemical treatment.

Chemical conversion films with a thickness of 2.0 μm were formed by coating a chemical treatment solutions of compositions shown in Table 1 on the surface of the aluminum-based plated steel sheet, and performing hot-air drying at a peak sheet temperature of 140° C.

Chemical treatment solutions Nos. 1-10, which are shown in Table 1, were prepared by adding group 4A metal compounds and/or the like, to water-based emulsions containing a fluororesin including a predetermined amount of a carboxyl group and a sulfonic acid group, and an emulsifier (25% by weight of a non-volatile component; see Table 2). The chemical treatment solution No. 11 was prepared by adding a group 4A metal compound, and/or the like, to a water-based emulsion containing a urethane resin and an emulsifier (25% by weight of a non-volatile component; see Table 2).

A water-based emulsion including a fluororesin was obtained by adding a predetermined amount of a fluoroolefin, a carboxyl-containing monomer, a sulfonic acid-containing monomer and an emulsifier to an aqueous solvent, and copolymerizing these monomers. As a water-based emulsion including a urethane resin, PR135 is used (manufactured by Sumika Bayer Urethane Co., Ltd.). As a silane coupling agent, A-1891 is used (manufactured by Momentive Performance Materials, Inc.).

TABLE 1

Compositions of Chemical Treatment Solutions

| Treatment solution no. | Organic resin | | Group 4A metal compound | | Other additives | |
|---|---|---|---|---|---|---|
| | Emulsion No. (see Table 2) | Concentration of organic resin in chemical treatment solution (g/L) | Type | Concentration in terms of a metal in chemical treatment solution (g/L) | Type | Concentration of additive in chemical treatment solution (g/L) |
| 1 | 1 | 250 | Hydrofluorotitanic acid | Ti: 4 | — | — |
| 2 | 2 | 250 | Fluorozirconic acid | Zr: 3 | — | — |
| 3 | 3 | 250 | Ammonium zirconium carbonate | Zr: 3 | Silane Coupling agent | 10 |
| 4 | 4 | 250 | Oxalic acid titanium ammonium | Ti: 1 | Silane Coupling agent | 10 |
| 5 | 5 | 250 | Fluorozirconic acid | Zr: 3 | Phosphate | P: 1 |
| 6 | 6 | 250 | Fluorozirconic acid | Zr: 3 | Silane Coupling agent | 10 |
| 7 | 7 | 250 | Fluorozirconic acid | Zr: 3 | Silane Coupling agent Phosphate | 10 P: 1 |
| 8 | 8 | 250 | Hydrofluorotitanic acid | Ti: 4 | — | — |
| 9 | 9 | 250 | Ammonium zirconium carbonate | Zr: 3 | — | — |
| 10 | 10 | 250 | — | — | Phosphate | P: 1 |
| 11 | 11 | 250 | Fluorozirconic acid | Zr: 3 | Silane Coupling agent | 10 |

TABLE 2

Compositions of Organic Resin Emulsions

| | Organic resin | | | | | | |
|---|---|---|---|---|---|---|---|
| Emulsion No. | Type | number-average molecular weight | Amount of a functional group in resin (% by wt.) | Carboxyl group/sulfonic acid group (molar ratio) | Fluorine atom amount in resin (% by wt.) | Concentration of organic resin in emulsion (g/L) | Concentration of emulsifier in emulsion (g/L) |
| 1 | Fluorine- | 10000 | 2.1 | 25 | 8 | 400 | 5 |
| 2 | containing | 10000 | 0.5 | 5 | 19 | 400 | 5 |
| 3 | olefin | 10000 | 4.1 | 27 | 15 | 400 | 7 |

TABLE 2-continued

Compositions of Organic Resin Emulsions

| Emulsion No. | Organic resin Type | number-average molecular weight | Amount of a functional group in resin (% by wt.) | Carboxyl group/sulfonic acid group (molar ratio) | Fluorine atom amount in resin (% by wt.) | Concentration of organic resin in emulsion (g/L) | Concentration of emulsifier in emulsion (g/L) |
|---|---|---|---|---|---|---|---|
| 4 | resin | 10000 | 4.9 | 25 | 12 | 400 | 9 |
| 5 | | 50000 | 4.9 | 35 | 16 | 400 | 4 |
| 6 | | 100000 | 4.0 | 100 | 14 | 400 | 5 |
| 7 | | 1000000 | 2.1 | 25 | 12 | 400 | 5 |
| 8 | Fluorine- | 900 | 9.6 | 5 | 14 | 400 | 7 |
| 9 | containing | 10000 | 0.04 | 9 | 16 | 400 | 20 |
| 10 | olefin resin | 10000 | 4.1 | 50 | 5 | 400 | 5 |
| 11 | Urethane resin | 10000 | 4.1 | 50 | 0 | 400 | 8 |

The amount of the group 4A metal, the amount of phosphate, the amount of the silane coupling agent in the chemical conversion film of each chemically treated aluminum-based plated steel sheet was measured using an X-ray fluorescence analyzer. The amount of the phosphate and the amount of the silane coupling agent were calculated from the measurement values for phosphorus and silicon. The amount of the group 4A metal, the amount of the phosphate, and the amount of the silane coupling agent with respect to the organic resin in the formed chemical conversion film for the chemical treatment solutions are shown in Table 3.

TABLE 3

Compositions of Chemical conversion films

| Treatment solution No. | Amount of group 4A metal with respect to organic resin (% by wt.) | Amount of phosphate with respect to organic resin (% by wt.) | Amount of silane coupling agent with respect to organic resin (% by wt.) |
|---|---|---|---|
| 1 | 1.6 | 0 | 0 |
| 2 | 1.2 | 0 | 0 |
| 3 | 1.2 | 0 | 4 |
| 4 | 0.4 | 0 | 4 |
| 5 | 1.2 | 0.4 | 0 |
| 6 | 1.2 | 0 | 4 |
| 7 | 1.2 | 0.4 | 4 |
| 8 | 1.6 | 0 | 0 |
| 9 | 1.2 | 0 | 0 |
| 10 | 0 | 0.4 | 0 |
| 11 | 1.2 | 0 | 4 |

2. Evaluation of Chemically Treated Aluminum-Based Plated Steel Sheet (1)

(1) Accelerated Weather Resistance Test

A test piece was cut from each chemically treated aluminum-based plated steel sheet and an accelerated weather resistance test (xenon lamp method) was performed under the conditions regulated in JIS K5600-7-7:2008. In the present test, as one cycle (two hours), water was sprayed to the test piece for 18-minutes within a 120 minute time period in which light from a xenon arc lamp was irradiated, and this cycle was repeated for 0-1,000 cycles (0, 500, and 1,000 cycles).

(2) Evaluation of Weather Resistance

With regard to each chemically treated aluminum-based plated steel sheet, the thickness of the chemical conversion film before and after the accelerated weather resistance test was measured by cross-sectional microscopic examination, and a coating film residual ratio was calculated. Each of chemically treated aluminum-based plated steel sheet was evaluated as "S" when the coating film residual ratio was at least 95%, "A" when the coating film residual ratio was 80% to less than 95%, "B" when the coating film residual ratio was 60% to less than 80% "C" when the coating film residual ratio was 30% to less than 60%, and "D" when the coating film residual ratio was less than 30%.

(3) Evaluation of Film Adhesion

With regard to each chemically treated aluminum-based plated steel sheet, a film residual ratio of a portion in which the metal thereof moved along a smooth surface with continuous contact on that surface was calculated after performing a draw-bead test (bead height of metal: 4 mm; welding force: 1.0 kN) using the test piece subjected or not subjected accelerated weather resistance test (size: 30 mm×150 mm). The film residual ratio was evaluated as "S" when the coating film residual ratio was at least 95%, "A" when the coating film residual ratio was 80% to less than 95%, "B" when the coating film residual ratio was 60% to less than 80% "C" when the coating film residual ratio was 30% to less than 60%, and "D" when the coating film residual ratio was less than 30%.

(4) Evaluation of Corrosion Resistance

With regard to each chemically treated aluminum-based plated steel sheet, a salt spray test (under the conditions regulated in JIS Z2371; 120 hours) was performed using the test piece subjected to the accelerated weather resistance test, and a white rust area ratio of a flat part was evaluated. Each of chemically treated aluminum-based plated steel sheet was evaluated as "S" when the white rust area ratio was no more than 5%, "A" when the white rust area ratio was exceeded 5% but was not more than 10%, "B" when the white rust area ratio exceeded 10% but was not more than 30%, "C" when the white rust area ratio exceeded 30% but was not more than 50%, and "D" when the white rust area ratio exceeded 50%.

(5) Evaluation Results

With respect to each chemically treated aluminum-based plated steel sheet (Examples 1-7 and Comparative Examples 1-4), the type of treatment solution used, and the evaluation results of the weather resistance test, the film adhesion test and the corrosion test of the flat part are all shown in Table 4.

TABLE 4

| | Treatment solution No. (see Table 1) | Weather resistance | | | Film adhesion | | | Corrosive resistance of flat part | | |
|---|---|---|---|---|---|---|---|---|---|---|
| | | 0 cyc | 500 cyc | 1000 cyc | 0 cyc | 500 cyc | 1000 cyc | 0 cyc | 500 cyc | 1000 cyc |
| Example 1 | 1 | S | S | S | S | S | A | S | S | A |
| Example 2 | 2 | S | S | S | S | S | A | S | S | A |
| Example 3 | 3 | S | S | S | S | S | A | S | S | S |
| Example 4 | 4 | S | S | S | S | S | A | S | S | S |
| Example 5 | 5 | S | S | S | S | S | A | S | S | S |
| Example 6 | 6 | S | S | S | S | A | A | S | A | B |
| Example 7 | 7 | S | S | S | S | S | S | S | S | S |
| Comp. Ex. 1 | 8 | S | B | C | S | S | B | A | B | D |
| Comp. Ex. 2 | 9 | S | S | C | S | S | B | B | B | D |
| Comp. Ex. 3 | 10 | S | A | C | S | B | D | C | C | D |
| Comp. Ex. 4 | 11 | S | D | D | S | D | D | S | D | D |

The weather resistance was evaluated in terms of the coating film residual ratio of the chemical conversion film after the accelerated weather resistance test. In the chemically treated aluminum-based plated steel sheet of Comparative Example 4 including a chemical conversion film containing a urethane resin, the chemical conversion film disappeared after 500 cycles (equivalent to five years of outdoor exposure). On the other hand, in the chemically treated aluminum-based plated steel sheets of Examples 1-7 including a chemical conversion film containing a fluororesin having a predetermined amount of a hydrophilic group and a group 4A metal compound, the thickness of the chemical conversion film hardly changed even after 1,000 cycles were repeated (equivalent to 10 years of outdoor exposure).

The film adhesion was evaluated based on the film residual ratio after the draw-bead test. Because the chemical conversion film disappeared after 500 cycles (equivalent to five years of outdoor exposure) in the chemically treated aluminum-based plated steel sheet of Comparative Example 4 including a chemical conversion film containing a urethane resin, not even the film after the draw-bead test remained. On the other hand, in the chemically treated aluminum-based plated steel sheets of Examples 1-7 including a chemical conversion film containing a fluororesin having a predetermined amount of a hydrophilic group and a group 4A metal compound, the adhesion of the film was excellent even after 1000 cycles were repeated (equivalent to 10 years of outdoor exposure).

The corrosion resistance was further evaluated by the white rust area ratio after the salt spray test. In the chemically treated aluminum-based plated steel sheet of Comparative Example 4 including a chemical conversion film containing a urethane resin, while corrosion resistance was excellent before the accelerated weather resistance test, the corrosion resistance was remarkably reduced along with film loss. Moreover, in the chemically treated aluminum-based plated steel sheets of Comparative Examples 1 and 2 including a chemical conversion film containing a fluororesin having an excess amount or negligible amount of a hydrophilic functional group and in the chemically treated aluminum-based plated steel sheet of Comparative Example 3 including a chemical conversion film that did not containing a group 4A metal compound, the corrosion resistance was inferior even before the accelerated weather resistance test. On the other hand, in the chemically treated aluminum-based plated steel sheets of Examples 1-7 formed of a chemical conversion film containing a fluororesin having a predetermined amount of hydrophilic groups and a 4A group compound, the corrosion resistance was excellent even after 1,000 cycles were repeated (equivalent to 10 years of outdoor exposure).

As seen from the above-described results, the chemically treated aluminum-based plated steel sheet of the present invention is superior in weather resistance, corrosion resistance, and film adhesion.

3. Preparation of Chemically Treated Aluminum-Based Plated Steel Sheet (2)

(1) Formation of Preliminary Chemical Conversion Film

The preliminary chemical conversion film was formed by hot-air drying at a peak sheet temperature of 70° C.-170° C., after coating the preliminary chemical treatment solution of a composition indicated in Table 5 on a surface of the above-described aluminum-based alloy plated steel sheet. Using an X-ray fluorescent analyzer, the composition of the formed preliminary chemical conversion film was analyzed. The results are shown in Table 6.

TABLE 5

Compositions of Preliminary Chemical treatment solutions

| Treatment Solution No. | Valve metal source | | F source | | Organic acid | | Phosphate source | |
|---|---|---|---|---|---|---|---|---|
| | Valve metal salt | Concentration of valve metal (g/L) | Fluoride | Concentration of F (g/L) | Organic acid | Concentration (g/L) | Phosphate | Concentration of P (g/L) |
| 12 | $(NH_4)_2ZrF_6$ | 10 | (Zr salt) | 12.5 | Tartaric acid | 10 | $H_3PO_4$ | 6 |
| 13 | $Zr(SO_4)_2$ | 8 | $NH_4F$ | 15 | Tartaric acid | 5 | $Mn(H_2PO_4)_2$ | 7.9 |
| 14 | $Na_2WO_4$ | 3 | (Ti salt) | 14.4 | Tannic acid | 8 | $H_3PO_4$ | 30 |
| | $(NH_4)_2TiF_6$ | 6 | | | | | | |
| 15 | $TiSO_4$ | 20 | (V salt) | 15 | Tannic acid | 5 | $MgHPO_4$ | 12 |
| | $VF_4$ | 10 | | | | | | |

TABLE 5-continued

Compositions of Preliminary Chemical treatment solutions

| Treatment Solution No. | Valve metal source | | F source | | Organic acid | | Phosphate source | |
|---|---|---|---|---|---|---|---|---|
| | Valve metal salt | Concentration of valve metal (g/L) | Fluoride | Concentration of F (g/L) | Organic acid | Concentration (g/L) | Phosphate | Concentration of P (g/L) |
| 16 | $K_2NbF_7$ | 16 | (Nb salt) | 22.9 | Oxalic acid | 15 | $H_3PO_4$ | 20 |
| 17 | $K_2(MoO_2F_4)$ | 20 | (Mo salt) | 15.8 | Tartaric acid | 10 | $(NH_4)H_2PO_4$ | 15 |
| 18 | $H_2TiF_6$ $V_2O_5$ | 5 3 | (Ti salt) | 11.9 | Citric acid | 20 | — | — |
| 19 | $(NH_4)VO_3$ $Na_2(MoO_2F_4)$ | 5 5 | (Mo salt) | 3.9 | Tartaric acid | 5 | — | — |

TABLE 6

Compositions of Preliminary Chemical Conversion Films

| Treatment Solution No. | Valve metal mass of deposit per unit area (mg/m$^2$) | Elemental concentration of preliminary chemical conversion film (atomic %) | | | |
|---|---|---|---|---|---|
| | | Valve metal | O | F | P |
| 12 | Zr: 52 | Zr: 17 | 76 | 4 | 3 |
| 13 | Zr: 41 | Zr: 15 | 74 | 6 | 5 |
| 14 | W: 15 Ti: 30 | W: 10 Ti: 5 | 63 | 5 | 17 |
| 15 | T: 44 V: 21 | Ti: 11 V: 6 | 76 | 3 | 4 |
| 16 | Nb: 61 | Nb: 15 | 75 | 4 | 6 |
| 17 | Mo: 51 | Mo: 19 | 75 | 2 | 4 |
| 18 | Ti: 10 V: 6 | Ti: 11 V: 7 | 72 | 10 | 0 |
| 19 | Mo: 21 V: 20 | Mo: 13 V: 23 | 60 | 4 | 0 |

(2) Formation of Chemical Conversion Film

A chemical conversion film with a thickness of 2.0 μm was formed by coating a chemical treatment solution with the above-described treatment solution No. 7 on the surface of the preliminary chemical conversion film, and performing hot-air drying at a peak sheet temperature of 140° C.

4. Evaluation of Chemically Treated Aluminum-Based Plated Steel Sheet (2)

An accelerated weather resistance test was implemented on the prepared chemically treated aluminum-based plated steel sheet by the same method as the above-described "Evaluation of chemically treated aluminum-based plated steel sheet (1)." Accordingly, weather resistance, blackening resistance, and corrosion resistance of a flat part and crosscut portion of the prepared chemically treated aluminum-based plated steel sheet were evaluated. The evaluation results are shown in Table 7. The corrosion resistance of the crosscut portion was evaluated according to the below-indicated method.

Evaluation of Corrosion Resistance of Crosscut Portion

A test piece was obtained by forming an x-shaped cut-out portion (cross-cut portion) on the surface of each chemically treated aluminum-based plated steel sheet and exposing the plating layer after the accelerated weather resistance test. A salt spray test was performed on the obtained test piece (under the conditions regulated in JIS Z2371; 120 hours), and the white rust area ratio of the crosscut portion was evaluated. Each of chemically treated aluminum-based plated steel sheet was evaluated as "S" when the white rust area ratio was no more than 5%, "A" when the white rust area ratio was exceeded 5% but was not more than 10%, "B" when the white rust area ratio exceeded 10% but was not more than 30%, "C" when the white rust area ratio exceeded 30% but was not more than 50%, and "D" when the white rust area ratio exceeded 50%.

TABLE 7

| | Treatment solution No. | | Weather resistance | | | Blackening resistance | | | Corrosive resistance of flat part | | | Corrosive resistance of crosscut part | | |
|---|---|---|---|---|---|---|---|---|---|---|---|---|---|---|
| | Preliminary chemical treatment solution (see Table 5) | Chemical treatment solution (see Table 1) | 0 cyc | 500 cyc | 1000 cyc | 0 cyc | 500 cyc | 1000 cyc | 0 cyc | 500 cyc | 1000 cyc | 0 cyc | 500 cyc | 1000 cyc |
| Example 8 | 12 | 7 | S | S | S | S | S | S | S | S | S | S | S | S |
| Example 9 | 13 | 7 | S | S | S | S | S | S | S | S | S | S | S | S |
| Example 10 | 14 | 7 | S | S | S | S | S | S | S | S | S | S | S | S |
| Example 11 | 15 | 7 | S | S | S | S | S | S | S | S | S | S | S | S |
| Example 12 | 16 | 7 | S | S | S | S | S | S | S | S | S | S | S | S |
| Example 13 | 17 | 7 | S | S | S | S | S | S | S | S | S | S | S | S |
| Example 14 | 18 | 7 | S | S | S | S | S | S | S | S | S | S | S | A |
| Example 15 | 19 | 7 | S | S | S | S | S | S | S | S | S | S | S | A |

In the chemically treated aluminum-based plated steel sheet of Examples 8-15 including a chemical conversion film containing a fluororesin having a predetermined amount of a hydrophilic group and a group 4A metal compound on the preliminary chemical conversion film, there was almost no reduction in thickness and brightness of the chemical conversion film even after 1,000 cycles were repeated (equivalent to 10 years of outdoor exposure).

Moreover, favorable results were demonstrated in the corrosion resistance test of the flat part, even in all of Examples. Furthermore, very favorable results were demonstrated in the corrosion resistance test of the crosscut portion, even in all of the Examples. It is thought that this is because the self-repair ability of the preliminary chemical conversion film has been achieved, and the crosscut portion (defective portion of the film) has been repaired. Particularly, in the chemically treated aluminum-based plated steel sheet of Examples 8-13 that included phosphorus in the preliminary chemical conversion film, the corrosion resistance of the cross-cut portion was further improved.

Reference Test

The results of an investigation on a relationship between an amount of a group 4A metal compound and an amount of emulsifier in a fluororesin film and permeability of the fluororesin film will now be described as a reference test.

A fluororesin film with a thickness of 30 μm was formed by using a bar coater to coat a chemical treatment solution, which was formulated by adding a predetermined amount of a group 4A metal compound to a fluororesin water-based emulsion having a hydrophilic functional group, which was prepared by adding an amount of a hydrophilic functional group containing monomer so as to become 1% by weight and by adding an amount of an emulsifier so as to become 1% by weight, onto the surface of the plated steel sheet, and performing hot-air drying at a peak sheet temperature of 140° C. The fluororesin film was peeled from the plated steel sheet, and cut into a predetermined size to be used as test piece. The permeability of each test piece (released fluororesin film) was measured under the conditions regulated in JIS Z0208 (measurement conditions: temperature of 40±0.5° C., relative humidity 90±2%, and 24 hour interval).

FIG. 1 is a graph showing a relationship between an amount of group 4A metal in the fluororesin film and permeability of the fluororesin film. It is clear from the graph that the permeability of the fluororesin film can be remarkably reduced by using at least 0.1% by weight of a group 4A metal amount in the fluororesin film.

A fluororesin film with a thickness of 30 μm was formed by using a bar coater to coat a chemical treatment solution, which was formulated by adding an amount so that a final concentration of a group 4A metal compound in terms of metal would become 1% by weight, to a fluororesin water-based emulsion having a hydrophilic functional group, which was prepared by adding an amount of a hydrophilic functional group containing monomer so as to become 1% by weight and by adding a predetermined amount of emulsifier, onto the surface of the plated steel sheet, and performing hot-air drying at a peak sheet temperature of 140° C. The fluororesin film was peeled from the plated steel sheet, and cut out into a predetermined size to be used as test piece. The permeability of each test piece (released fluororesin film) was measured under the conditions regulated in JIS Z0208 (measurement conditions: temperature of 40±0.5° C., relative humidity 90±2%, and 24 hour interval).

Figure 2:
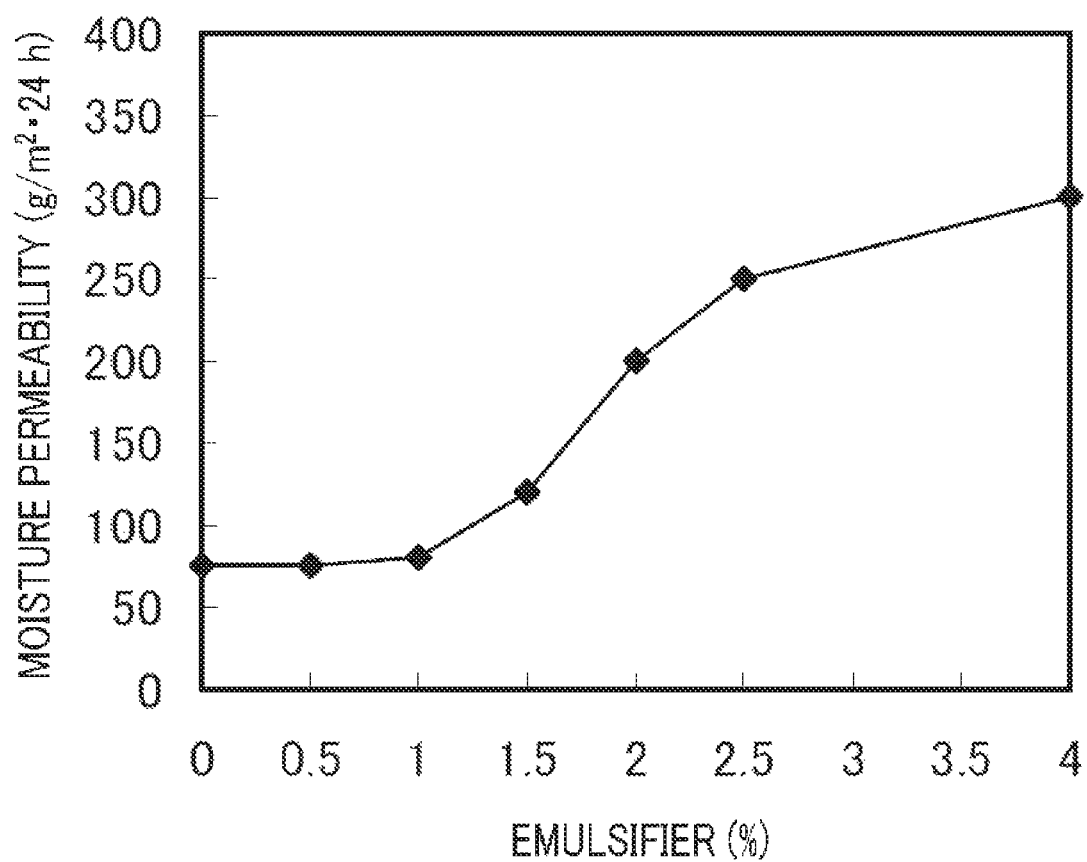
FIG. 2 is a graph showing a relationship between a concentration of an emulsifier in a fluororesin emulsion and moisture permeability of a fluororesin film.

FIG. 2 is a graph showing a relationship between a concentration of emulsifier in a fluororesin water-based emulsion and a permeability of the fluororesin film. It is clear from the graph that the permeability of the fluororesin film can be remarkably reduced by using no more than 1% by weight of emulsifier in the emulsion.

As seen from the above-described results, a fluororesin film containing a large quantity of a group 4A metal compound and small residual quantity of an emulsifier is superior in water resistance.

The disclosure of Japanese Patent Application No. 2010-139682, filed on Jun. 18, 2010, and Japanese Patent Application No. 2011-042209, filed on Feb. 28, 2011, including the specification, drawings and abstract, are incorporated herein by reference in its entirety.

INDUSTRIAL APPLICABILITY

Because the chemically treated aluminum-based plated steel sheet of the present invention is superior in weather resistance, water resistance and film adhesion, the chemically treated aluminum-based plated steel sheet of the present invention is useful in various applications such as an exterior building material. For example, the chemically treated aluminum-based plated steel sheet of the present invention may be suitably used in an application such as 1) steel pipes, shaped steel, support posts, beams, and conveyance parts for a green house or agricultural house; 2) sound insulation walls, sound-proof walls, sound absorbing walls, snow barriers, guard rails, bridge railing, protective fence, and supporting posts; and 3) railroad car parts, rail parts, parts for electric installation, parts for environmental safety, structural parts, and solar mounts.

The aluminum-based alloy plated steel sheet is sufficiently attached to the coating film under a high temperature and high humidity, and is superior in corrosion resistance. Accordingly, the chemically treated aluminum-based plated steel sheet of the present invention is particularly suitable as an exterior building material employed under a high temperature and high humidity environment.

The invention claimed is:

1. A chemically treated aluminum-based plated steel sheet, comprising:
   an aluminum-based alloy plated steel sheet, the aluminum-based alloy containing 85-99% by weight of aluminum; and
   a chemical conversion film having a film thickness of 0.5-10 μm formed on a surface of the aluminum-based alloy plated steel sheet,
   wherein the chemical conversion film contains a fluororesin and a group 4A metal compound, the fluororesin containing a total of 0.05-5% by weight of a hydrophilic functional group selected from the group consisting of a carboxyl group, a sulfonic acid group and a salt thereof, and 7-20% by weight of a fluorine atom, and
   the group 4A metal compound content, with respect to the fluororesin, is within a range of 0.1-5% by weight in terms of a group 4A metal of the group 4A metal compound.

2. The chemically treated aluminum-based plated steel sheet according to claim 1, wherein a ratio between the carboxyl group and the sulfonic acid group included in the fluororesin in terms of a carboxyl group/sulfonic acid group molar ratio is 5-60.

3. The chemically treated aluminum-based plated steel sheet according to claim 1, wherein the chemical conversion film further contains a phosphate, and an amount of the phosphate with respect to the fluororesin is within a range of 0.05-3% by weight in terms of phosphorus.

4. The chemically treated aluminum-based plated steel sheet according to claim 1, wherein the chemical conversion film further contains a silane coupling agent, and an amount of the silane coupling agent with respect to the fluororesin is within a range of 0.5-5% by weight.

5. The chemically treated aluminum-based plated steel sheet according to claim 1, wherein the group 4A metal is selected from the group consisting of Ti, Zr, Hf, and any combination thereof.

6. The chemically treated aluminum-based plated steel sheet according to claim 1, further comprising a preliminary chemical conversion film containing an oxide or hydroxide of a valve metal and fluoride of a valve metal, the preliminary chemical conversion film formed between the aluminum-based alloy plated steel sheet and the chemical conversion film.

7. A method of preparing a chemically treated aluminum-based plated steel sheet, the method comprising:
preparing an aluminum-based alloy plated steel sheet, the aluminum-based alloy including 85-99% by weight of aluminum; and
forming a chemical conversion film that has a thickness 0.5-10 µm, by coating and drying a chemical treatment solution on a surface of the aluminum-based alloy plated steel sheet, wherein:
the chemical treatment solution contains a fluororesin and at least one selected from the group consisting of an oxoate, a fluoride, a hydroxide, an organic salt, a carbonate and a peroxygenated salt of a group 4A metal, the fluororesin containing a total of 0.05-5% by weight of a hydrophilic functional group selected from the group consisting of a carboxyl group, a sulfonic acid group and a salt thereof, and 7-20% by weight of a fluorine atom, the fluororesin having a number-average molecular weight of 1,000-2,000,000; and
the total amount of the oxoate, the fluoride, the hydroxide, the organic salt, the carbonate and the peroxygenated salt of the group 4A metal is within a range of 0.1-5% by weight, in terms of the group 4A metal, with respect to the fluororesin.

8. The method of preparing the chemically treated aluminum-based plated steel sheet according to claim 7, wherein a ratio between the carboxyl group and the sulfonic acid group included in the fluororesin in terms of a carboxyl group/sulfonic acid group molar ratio is 5-60.

9. The method of preparing the chemically treated aluminum-based plated steel sheet according to claim 7, wherein the chemical treatment solution further contains a phosphate, and an amount of the phosphate with respect to the fluororesin is within a range of 0.05-3% by weight in terms of phosphorus.

10. The method of preparing the chemically treated aluminum-based plated steel sheet according to claim 7, wherein the chemical treatment solution further contains a silane coupling agent, and an amount of the silane coupling agent with respect to the fluororesin is within a range of 0.5-5% by weight.

11. The method of preparing the chemically treated aluminum-based plated steel sheet according claim 7, wherein the group 4A metal compound is selected from the group consisting of Ti, Zr, Hf, and any combination thereof.

12. The method of preparing the chemically treated aluminum-based plated steel sheet according to claim 7, further comprising: forming a preliminary chemical conversion film by coating and drying a preliminary chemical treatment solution on a surface of the aluminum-based alloy plated steel sheet before forming the chemical conversion film, wherein the preliminary chemical treatment solution contains a valve metal salt and a fluoride ion.

* * * * *